United States Patent  
Liao

(10) Patent No.: US 11,255,372 B2  
(45) Date of Patent: Feb. 22, 2022

(54) ANTI-THEFT SUCTION CUP STRUCTURE

(71) Applicant: Chin-Hui Liao, Taichung (TW)

(72) Inventor: Chin-Hui Liao, Taichung (TW)

( * ) Notice: Subject to any disclaimer, the term of this patent is extended or adjusted under 35 U.S.C. 154(b) by 197 days.

(21) Appl. No.: 16/844,074

(22) Filed: Apr. 9, 2020

(65) Prior Publication Data

US 2021/0317867 A1 Oct. 14, 2021

(51) Int. Cl.
*F16B 47/00* (2006.01)
*B60R 9/04* (2006.01)

(52) U.S. Cl.
CPC .............. *F16B 47/00* (2013.01); *B60R 9/04* (2013.01)

(58) Field of Classification Search
CPC .......... F16B 47/00; F16B 47/006; A47G 1/17; B25B 11/005; B65G 49/061; B60R 9/04
See application file for complete search history.

(56) References Cited

U.S. PATENT DOCUMENTS 7,124,987 B2 * 10/2006 Zschiedrich ............ F16B 47/00
248/205.9
9,494,184 B1 * 11/2016 Lee ....................... F16M 13/022
2007/0210225 A1 * 9/2007 Carnevali ............... F16B 47/00
248/205.8
2015/0377280 A1 * 12/2015 Potters ................... F16M 13/02
248/205.9
2017/0248164 A1 * 8/2017 Wang ...................... F16B 47/00
2018/0135688 A1 * 5/2018 Kang ................... H05K 5/0217
2021/0025440 A1 * 1/2021 Scanlon ................ F16B 47/00
2021/0324841 A1 * 10/2021 Schmidt ............... B25B 11/007

* cited by examiner

*Primary Examiner* — Corey N Skurdal

(57) ABSTRACT

An anti-theft suction cup structure includes a suction-cup body and a pressure ring. The suction-cup body has a suction end and a braking end. The suction end has a cup groove recessed on a side thereof toward the braking end, the braking end has an exhaust part formed thereon and is normally in a closed status. The pressure ring is mounted on an outer periphery of the suction-cup body. When the suction end is used for suction, air in the cup groove is extracted to form vacuum between the cup groove and the attached object, the sidewall of the cup groove is tightly attached with the attached object. When air is injected into between the cup groove and the attached object, non-vacuum is formed between the cup groove and the attached object. In vacuum, the pressure ring is configured to press hard on the suction-cup body.

10 Claims, 11 Drawing Sheets

Figure 1:
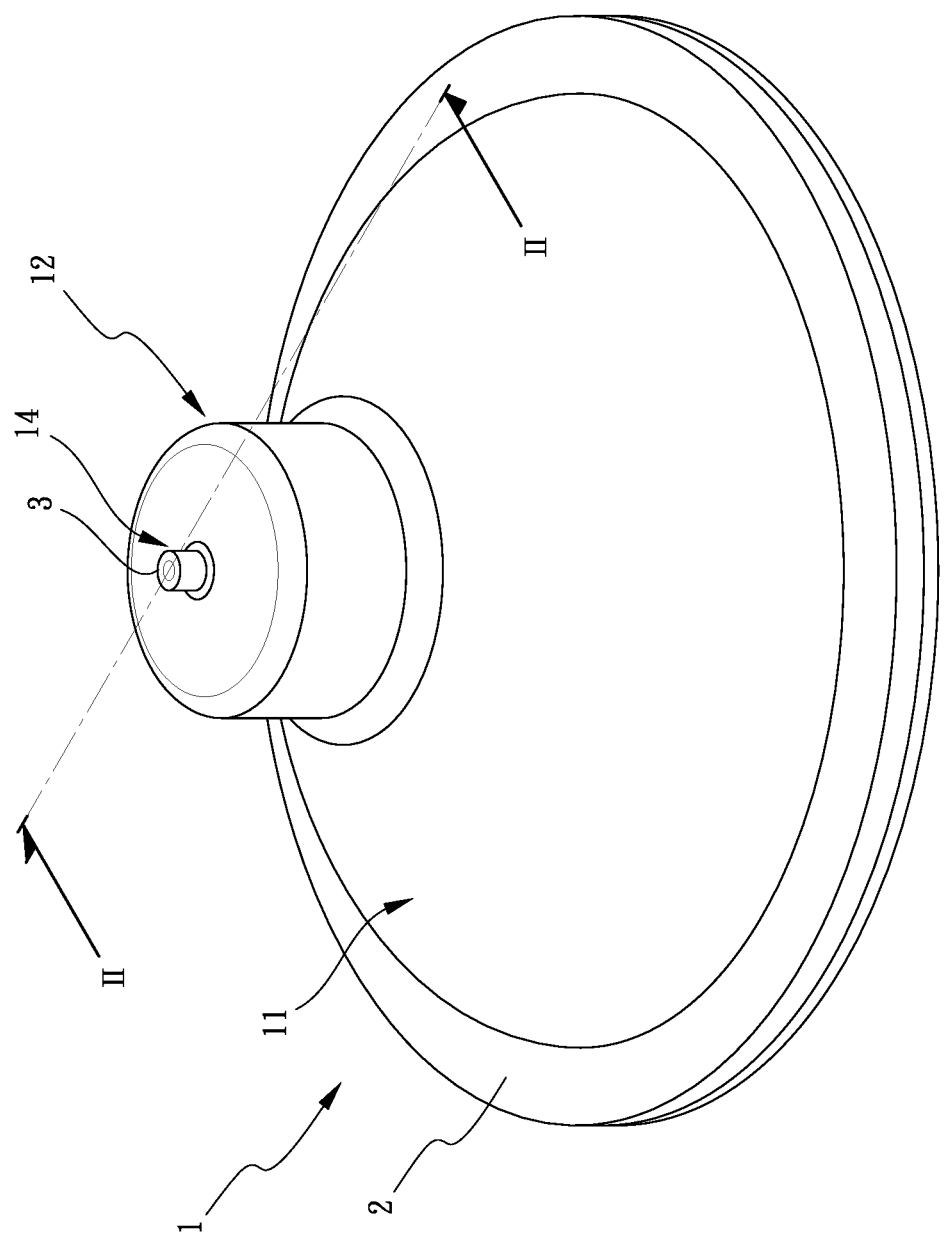

ANTI-THEFT SUCTION CUP STRUCTURE

BACKGROUND OF THE INVENTION

1. Field of the Invention

The present invention relates to an anti-theft suction cup structure which can stably mount a car roof carrier on the car roof and prevent the car roof carrier from being stolen, and the anti-theft suction cup structure of the present invention has excellent practicability.

2. Description of the Related Art

There are two kinds of accessories commonly to mount car carriers on car roofs, the first kind of accessory is a hook-like accessory which can be mounted on an end of a car roof carrier, and the hook-like accessories mounted on the two ends of the car roof carrier can be hooked to the door; the second kind of accessories are suction cups mounted on two ends of the bottom surface of the car roof carrier, and the suction cups can be attached with the car roof by suction principle. In recent years, the use of suction cups for car roof carriers is very common, and the design of a flat car roof and air extraction of the suction cup can make the suction cup stably attached on the car roof. However, the first problem of the conventional suction cup is that it is very easy to be pulled out, when the peripheral edge of the conventional suction cup is poked slightly, the vacuum suction status between the conventional suction cup and the car roof may be released. The second problem is that the conventional suction cup is easy to be stolen, and if the thief can pull the suction cup away, the bicycle on the car roof carrier can be effortlessly stolen to get lost. Therefore, whether the suction cup can be effortlessly pulled up is a key issue of how to protect the object mounted on the car roof from being stolen.

SUMMARY OF THE INVENTION

An objective of the present invention is to prevent an object or a car carrier mounted on a car roof from being stolen to get lost, so as to solve the problem caused by conventional suction cup. In order to achieve the objective, the present invention provides an anti-theft suction cup structure including a suction-cup body and a pressure ring. The suction-cup body has a suction end and a braking end disposed on two ends thereof, respectively, and the suction end has a cup groove recessed on a side thereof toward the braking end, and the braking end has an exhaust part formed thereon and being in a closed status normally. The pressure ring is mounted on an outer periphery of the suction-cup body, and an outer edge of the pressure ring is aligned with the outermost edge of the suction-cup body.

In order to achieve the objective, the present invention provides an anti-theft suction cup structure which is configured to be sucked on or pulled away from a car roof and for use with an inflating assembly, the inflating assembly includes an exhaust nozzle, and the anti-theft suction cup structure includes a suction-cup body and a pressure ring. The suction-cup body has a suction end and a braking end disposed on two ends thereof, respectively, and the suction end has a cup groove recessed on a side thereof toward the braking end, the braking end has an exhaust part formed thereon and being normally in a closed status, and an end, where the exhaust nozzle is disposed, of the inflating assembly is plugged into the braking end of the suction-cup body for suction. The pressure ring mounted on an outer periphery of the suction-cup body, and the outer edge of the pressure ring is aligned with the outermost edge of the suction-cup body. When the suction end of the suction-cup body is used for suction, the exhaust nozzle of the inflating assembly is used to extract air inside the cup groove to form a vacuum status between the cup groove and the car roof, to cause the sidewall of the cup groove of the suction-cup body to be tightly attached on the car roof; when air is injected into between the cup groove and the car roof through the exhaust nozzle of the inflating assembly, a non-vacuum status is formed between the cup groove and the car roof, wherein in the vacuum status, the pressure ring is configured to press hard on the suction-cup body.

BRIEF DESCRIPTION OF THE DRAWINGS

The structure, operating principle and effects of the present invention will be described in detail by way of various embodiments which are illustrated in the accompanying drawings.

FIG. 1 is a perspective view of a first embodiment of an anti-theft suction cup structure of the present invention.

FIG. 2 is a schematic cross-sectional view taken along II-II of FIG. 1.

FIG. 3 is a perspective exploded view of an inflating assembly and an anti-theft suction cup structure of the present invention.

FIG. 4 is a schematic cross-sectional view of an operation of plugging an inflating assembly to push a plug ball to move downwardly, according to the present invention.

FIG. 5 is a schematic cross-sectional view of a deformed suction end with a groove bottom of a cup groove attached on the car roof after the inflating assembly extracts air completely.

FIG. 6 is schematic view of an opening of a vent sealed by a plug ball subject to pressure of deformation of a suction end after an inflating assembly is pulled away.

FIG. 7 is a perspective view of a second embodiment of an anti-theft suction cup structure of the present invention.

FIG. 8 is a schematic cross-sectional view taken along VIII-VIII of FIG. 7.

FIG. 9 is a schematic cross-sectional view of an operation of plugging an inflating assembly into the anti-theft suction cup structure of FIG. 8.

FIG. 10 is a perspective view of a third embodiment of an anti-theft suction cup structure of the present invention.

FIG. 11 is a schematic cross-sectional view taken along XI-XI of FIG. 10.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Please refer to FIGS. 1 to 11. An anti-theft suction cup structure of the present invention can be sucked on or pulled away from a car roof (not shown in figures) for use with an inflating assembly 10 having an exhaust nozzle 101. The anti-theft suction cup structure includes a suction-cup body 1 and a pressure ring 2. The suction-cup body 1 is in an inverted-cup shape, and the suction-cup body 1 has a suction end 11 and a braking end 12 disposed on two ends thereof, respectively. The suction end 11 has a cup groove 13 recessed on a side thereof toward the braking end 12, and the braking end 12 has an exhaust part 14 formed thereon and normally in a closed status. The inflating assembly 10 can be plugged into and assembled with the exhaust part 14; and an end, where the exhaust nozzle 101 is disposed, of the inflating assembly 10 can be plugged into the braking end 12 of the suction-cup body 1 for air extraction or air injection. The pressure ring 2 is mounted on an outer periphery of the suction-cup body 1, and an outer edge of the pressure ring 2 is aligned with the outermost edge of the suction-cup body 1. When the suction end 11 of the suction-cup body 1 is used for suction, an exhaust nozzle 101 of the inflating assembly 10 can be used to extract air in the cup groove 13, to form a vacuum status between the cup groove 13 and the car roof, and cause a sidewall of the cup groove 13 of the suction-cup body 1 to be tightly attached on the car roof. When air is injected into between the cup groove 13 and the car roof through the exhaust nozzle 101 of the inflating assembly 10, a non-vacuum status can be formed between the cup groove 13 and the car roof. In the vacuum status, the pressure ring 2 can be configured to press hard on the suction-cup body 1.

Figure 4:
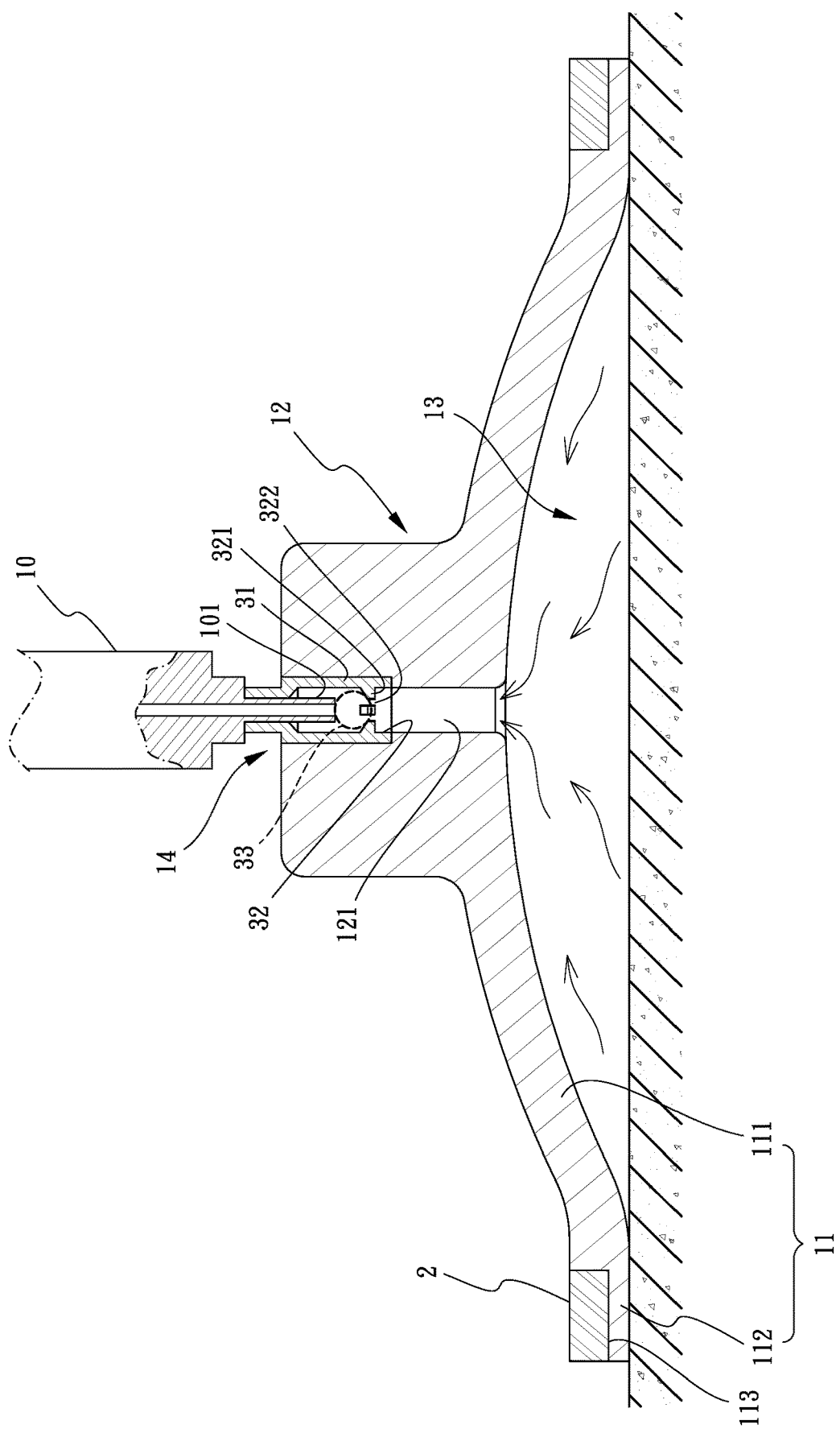
Figure 5:
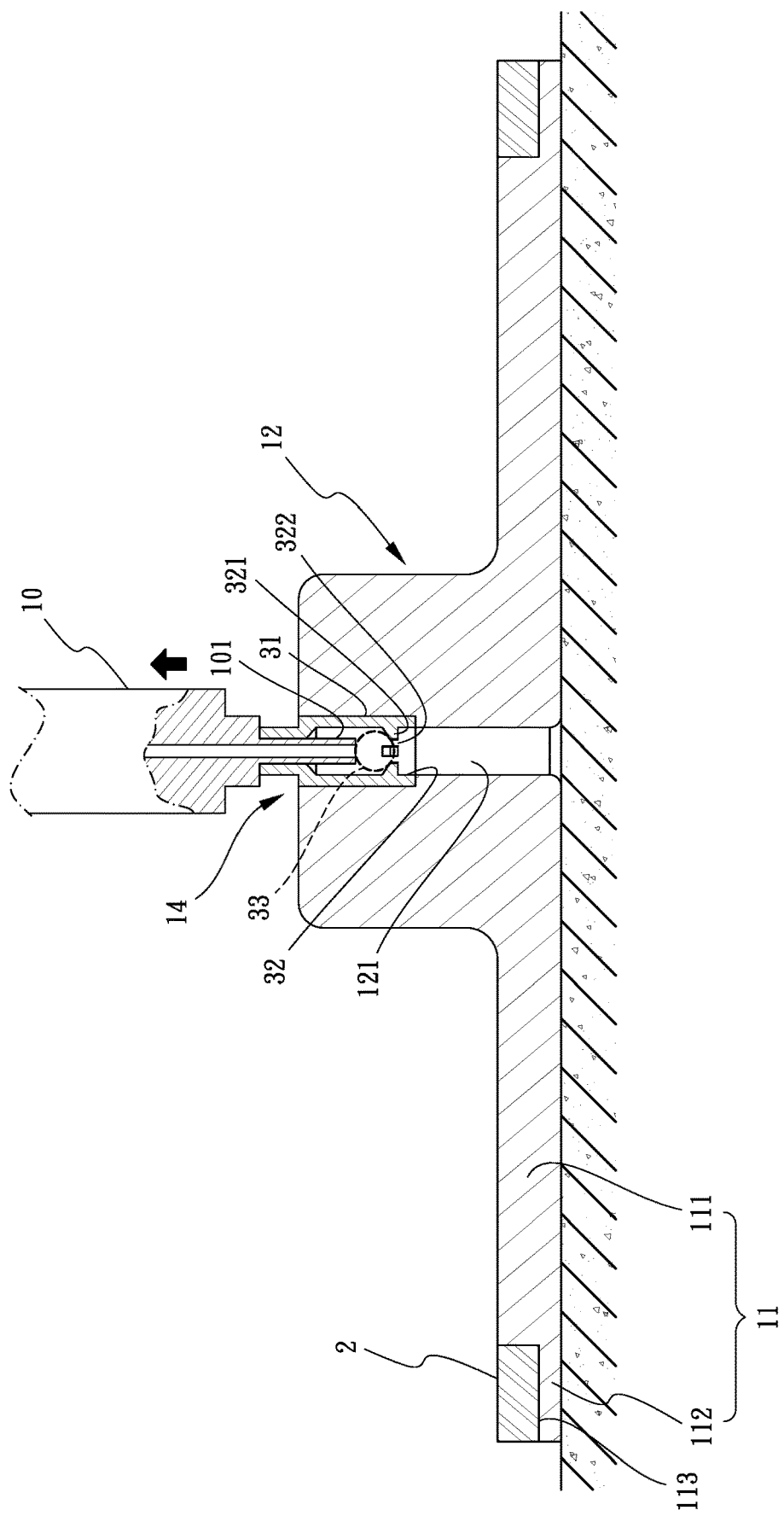
Figure 6:
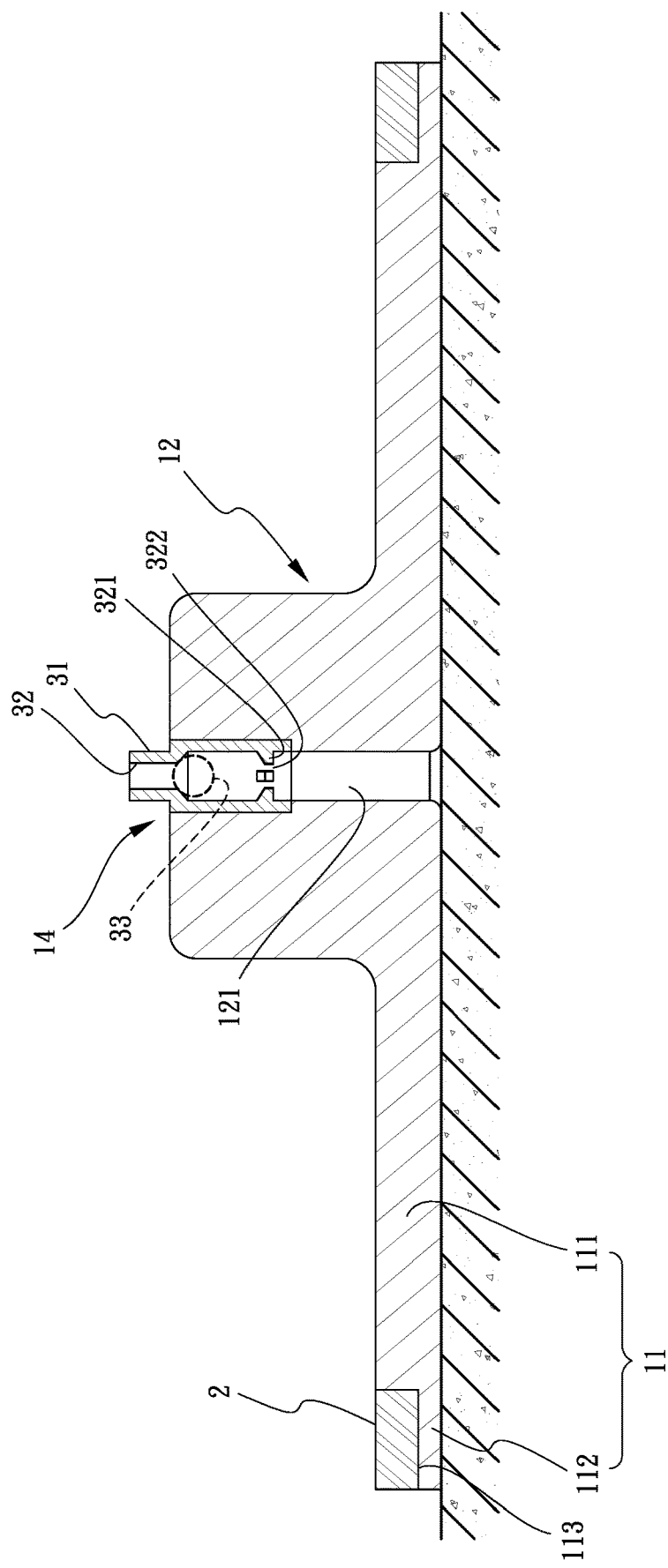

According to aforementioned contents, the conventional suction cup may easily fail to tightly attached on the car roof when an edge of the conventional suction cup is poked, and a person with bad intention can steal the suction cup and the car roof carrier effortlessly; therefore, in use, the plurality of suction-cup bodies 1 are mounted on a side of a car roof carrier (not shown in figures) first, and after the plurality of suction-cup bodies 1 are mounted on the side of the car roof carrier completely, the car roof carrier with the plurality of suction-cup body 1 are moved to the car roof of the car, and after the mount position of the car roof carrier is confirmed, the suction ends 11 of the suction-cup bodies 1 are then attached on the car roof of the car, and the exhaust nozzle 101 of the inflating assembly 10 is plugged into the exhaust part 14 of the braking end 12 of each suction-cup body to extract air, so as to use the inflating assembly 10 to extract air between the cup groove 13 and the car roof. When the inflating assembly 10 is plugged in the exhaust part 14 initially, the exhaust part 14 is forced to change from a normally-closed status to an open status, and when the inflating assembly 10 extracts air, the air in the cup groove 13 is getting less and the suction end 11 is deformed gradually, and it causes the groove bottom face of the cup groove 13 to be close to the car roof gradually until a vacuum status is formed between the cup groove 13 and the car roof, and the inflating assembly 10 can be pulled away from the exhaust part 14 after the vacuum status is formed. When the inflating assembly 10 is pulled away from the exhaust part 14, the exhaust part 14 is immediately restored to the original normally-closed status. The above-mentioned operations can be performed on all suction-cup bodies 1 for air extraction. With configuration of the pressure ring 2, the pressure ring 2 can indeed press hard on the outermost edge of the suction-cup body 1 after the air extraction operations of the suction-cup body 1 are completed, so as to protect the anti-theft suction cup structure of the present invention from being poked; in this way, the suction-cup body 1 can be stably combined on the car roof of the car, and the car roof carrier and the suction-cup body 1 can also be protected from being stolen to get lost, as shown in FIGS. 4 to 6.

The present invention provides two embodiments for illustration, but the type of the exhaust part 14 of the present invention is not limited to the two embodiment, and the technology equivalent to the exhaust part 14 of the present invention are also included within the scope of the appended claims. Please refer to FIGS. 2 and 3, the exhaust part 14 comprises a one-way valve 3, and the braking end 12 has a through hole 121 formed thereon, and through hole 121 penetrates from the top of the braking end 12 to the suction end 11, and in communication with the cup groove 13. The one-way valve 3 is embedded in the through hole 121 and a part of the one-way valve 3 is protruded out of the through hole 121, and the one-way valve 3 includes a valve body 31, a vent 32 and a plug ball 33, the vent 32 penetrates through two ends of the valve body 31 and is in communication with the cup groove 13. The vent 32 has a plurality of stop ribs 321 protruded on an end, embedded in the through hole 121, of an inner wall thereof. The plurality of stop ribs 321 are arranged in interval and around the inner wall of the vent 32, and two adjacent stop ribs 321 can form an air channel 322. The end, where the plurality of stop ribs 321 are disposed, of the vent 32 is tapered toward the end, which is protruded out of the through hole 121, of the vent 32. The plug ball 33 is movably disposed in the vent 32. When an end of the exhaust nozzle 101 of the inflating assembly 10 is plugged into the one-way valve 3 of the exhaust part 14, the plug ball 33 is pushed to move toward the plurality of stop ribs 321 for air extraction or air injection; at this time, the plug ball 33 is blocked by the stop ribs 321 and has limited movement, so that an opening can be formed between the plug ball 33 and the air channels 322 to flow air, and the inflating assembly 10 can extract air between the cup groove 13 and the car roof through the air channels 322; after the inflating assembly 10 extracts air completely to form the vacuum status, the plug ball 33 is pressed to move subject to deformation of the suction end 11 of the suction-cup body 1, and the vacuum status also causes the plug ball 33 to move toward the air extraction position, so as to seal the opening of the vent 32 to block the outside air from entering.

Figure 7:
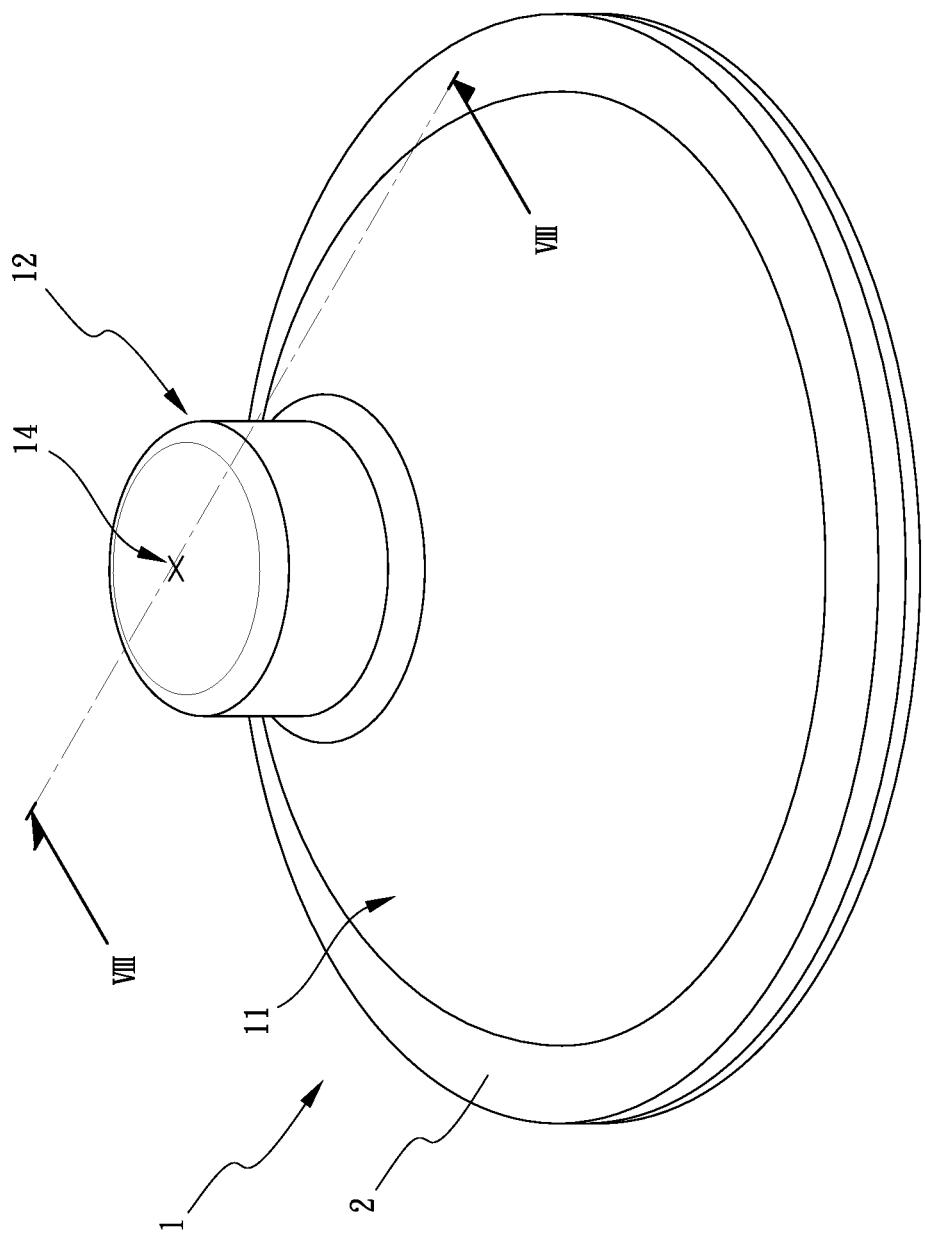
Figure 8:
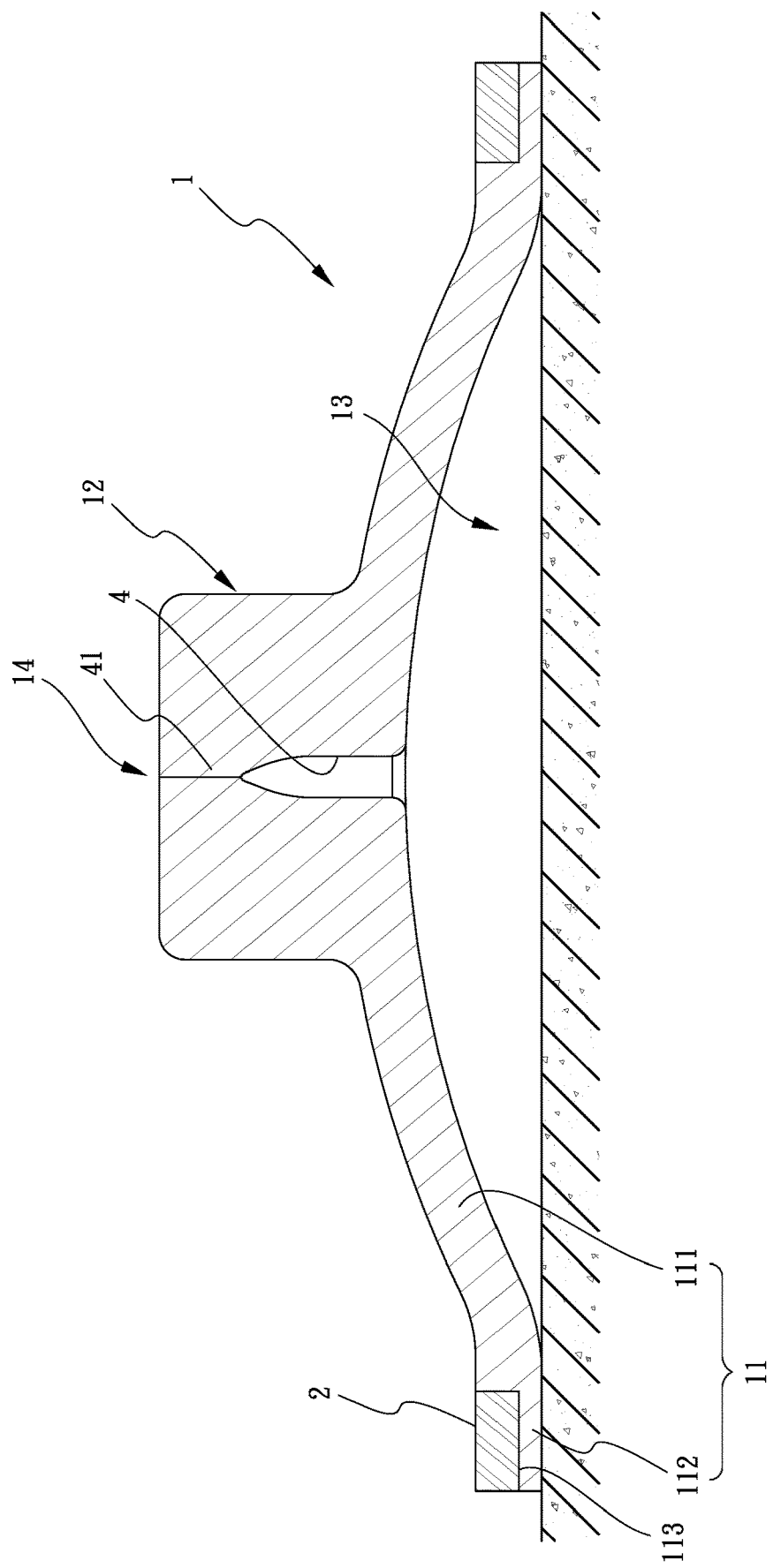
Figure 9:
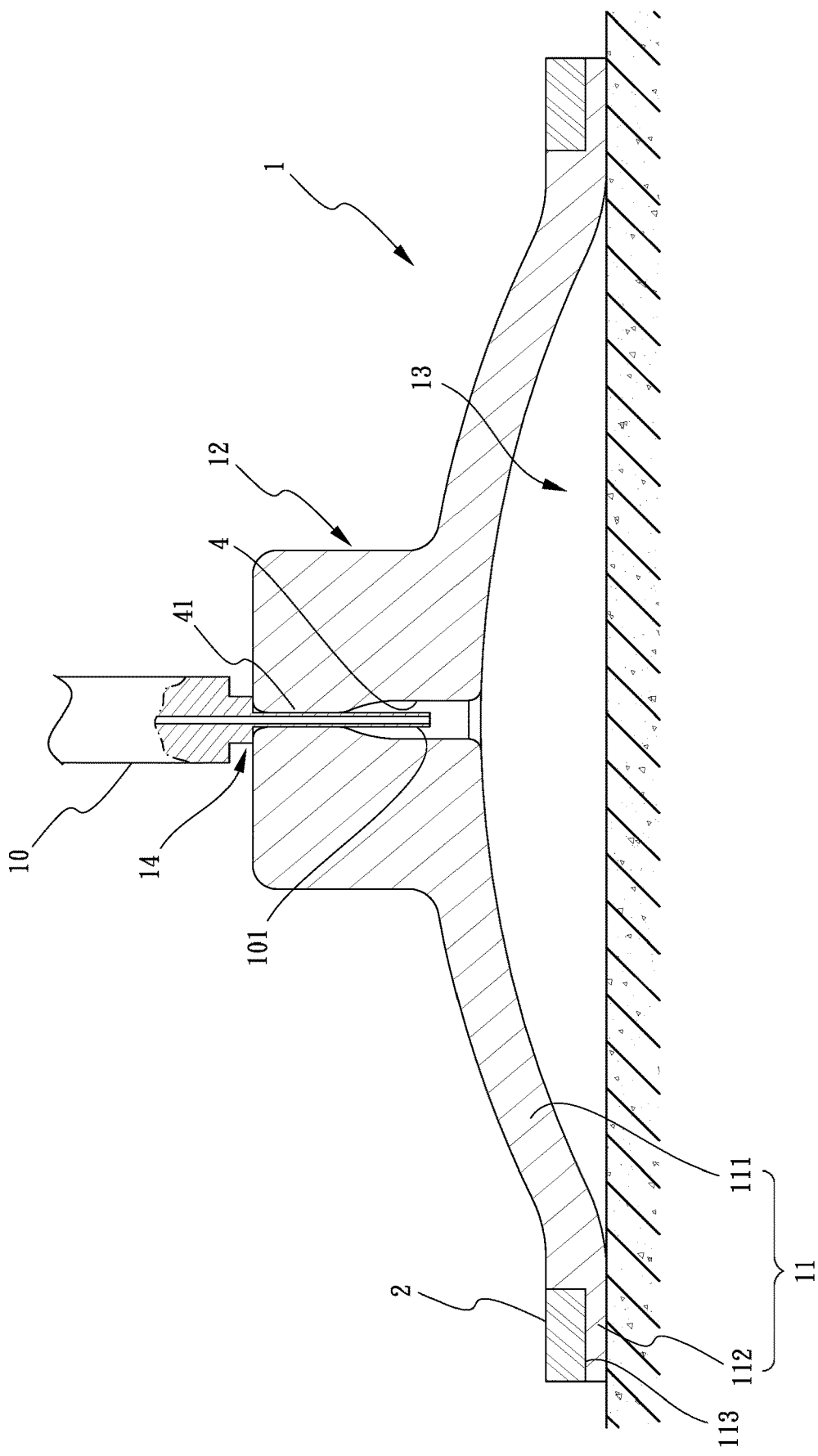

Please refer to FIGS. 7 to 9. The exhaust part 14 can have a connection hole 4 penetrating through the top face of the braking end 12 and in communication with the cup groove 13 of the suction end 11. The connection hole 4 is formed with at least two at least two valve parts 41 disposed on inner wall thereof, the at least two valve parts 41 are bendable and normally closed to block communication between the connection hole 4 and the cup groove 13. When the end of the exhaust nozzle 101 of the inflating assembly 10 is plugged into the braking end 12, the inflating assembly 10 can push the at least two valve parts 41 to deform, so as to make the connection hole 4 in communication with the cup groove 13; in this way, the inflating assembly 10 can perform air extraction or air injection; otherwise, after the inflating assembly 10 is pulled away from the braking end 12, the at least two valve parts 41 are restored to the normally-closed status. The above-mentioned configuration can make the suction-cup body 1 attached on the car roof tightly, and the pressure ring 2 can indeed press hard on the suction-cup body 1, so as to prevent the suction-cup body 1 from being pulled away from the car roof, thereby achieving anti-theft effect.

Figure 2:
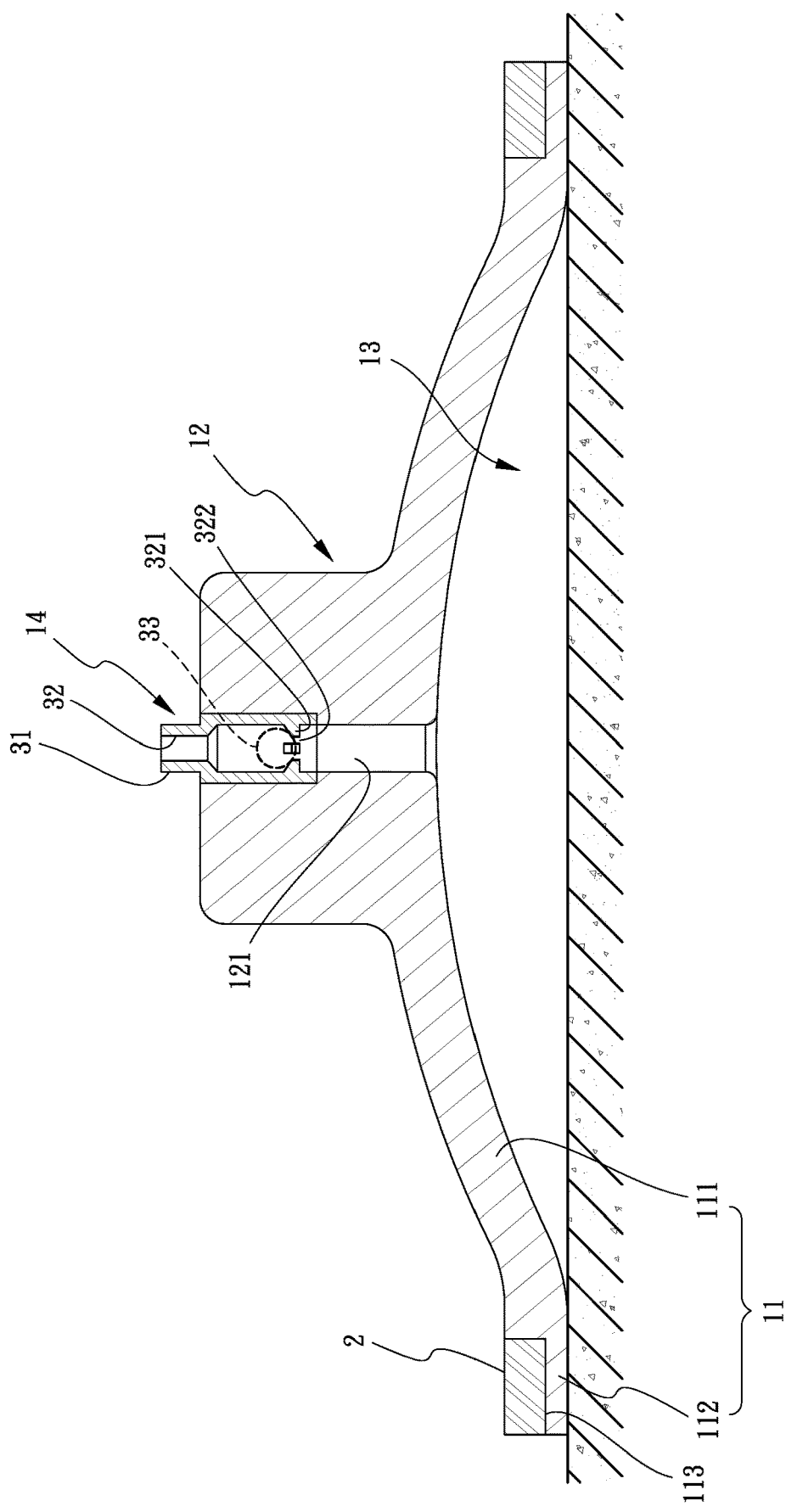
Figure 3:
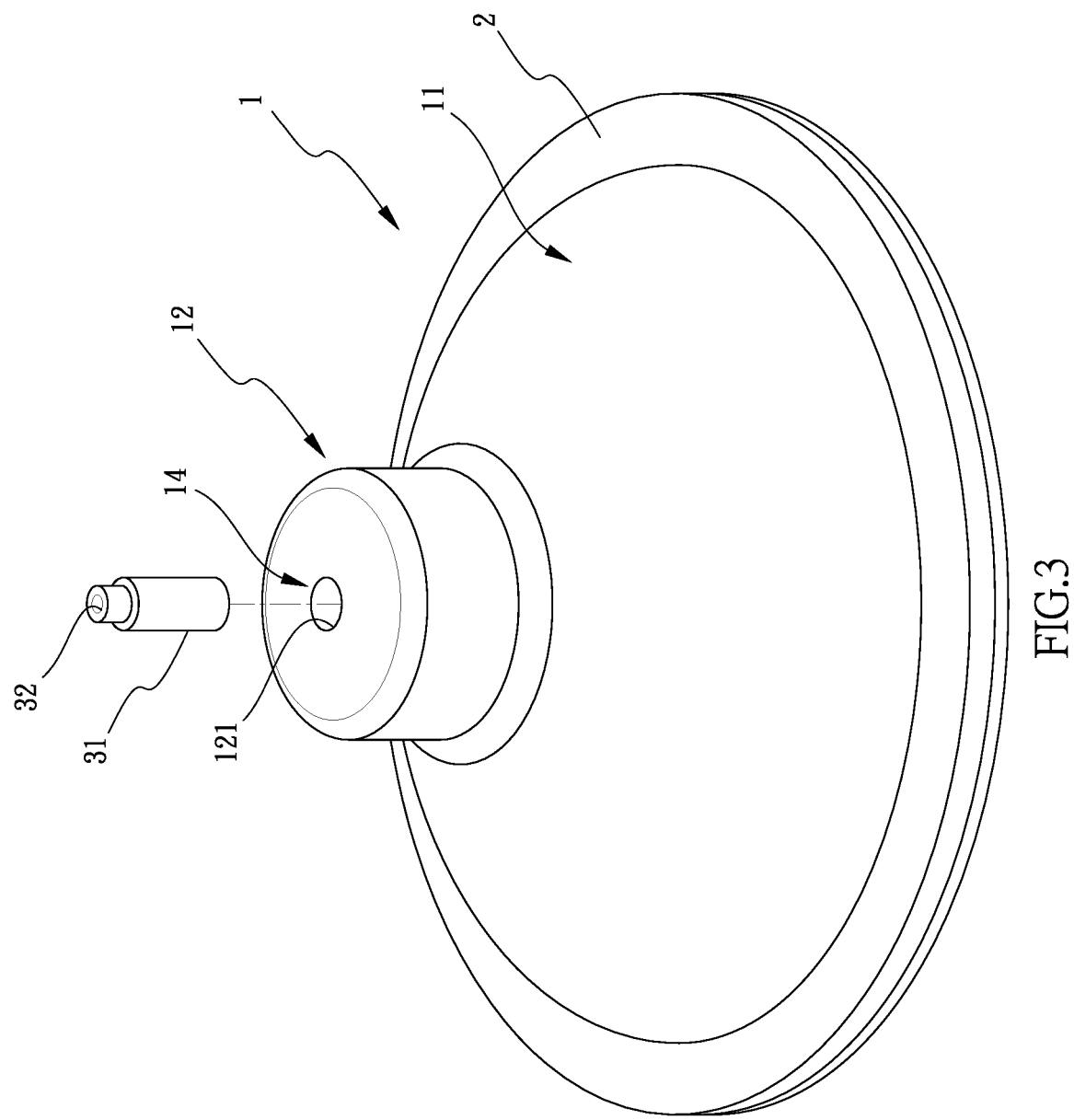
Figure 10:
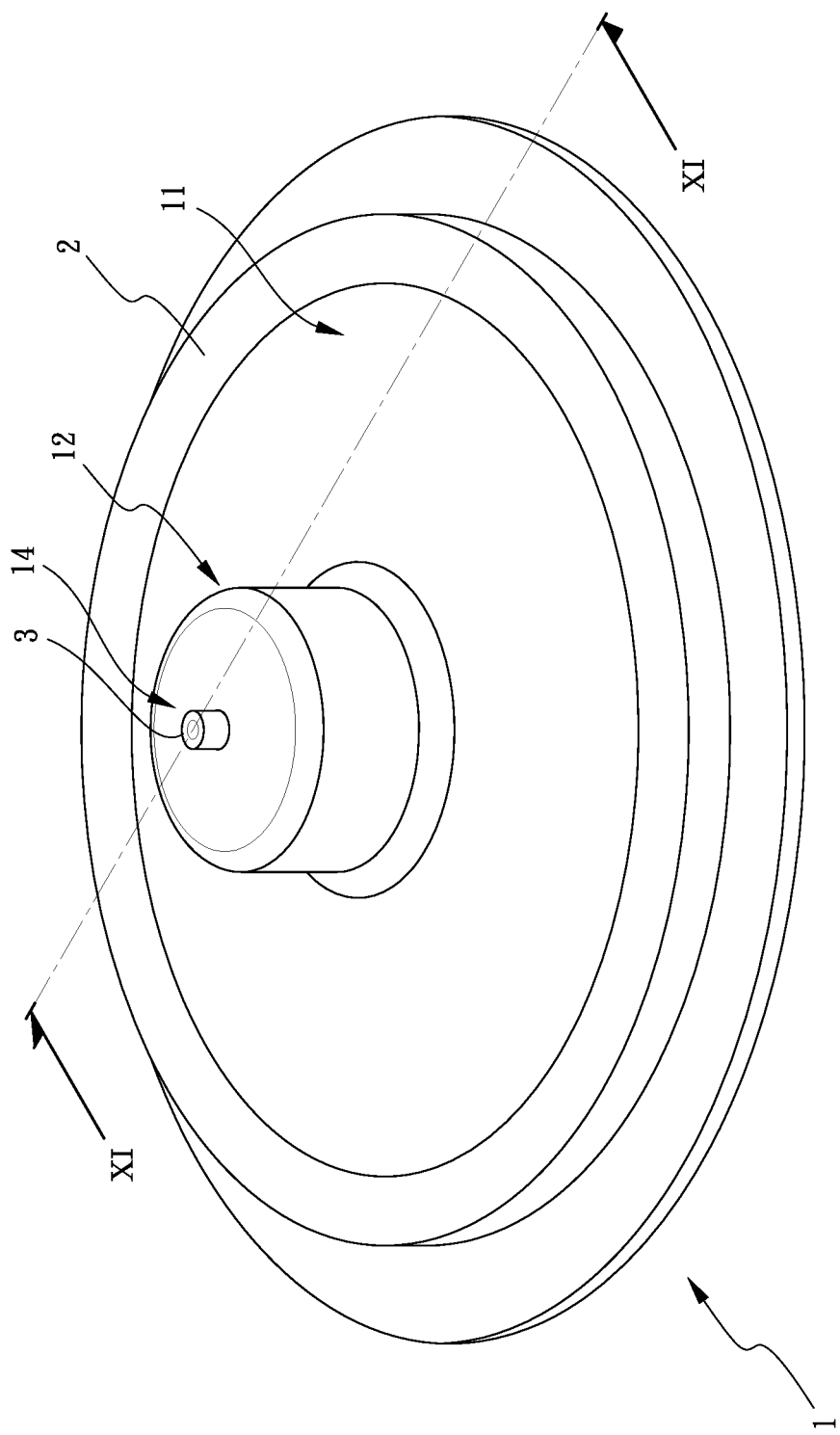
Figure 11:
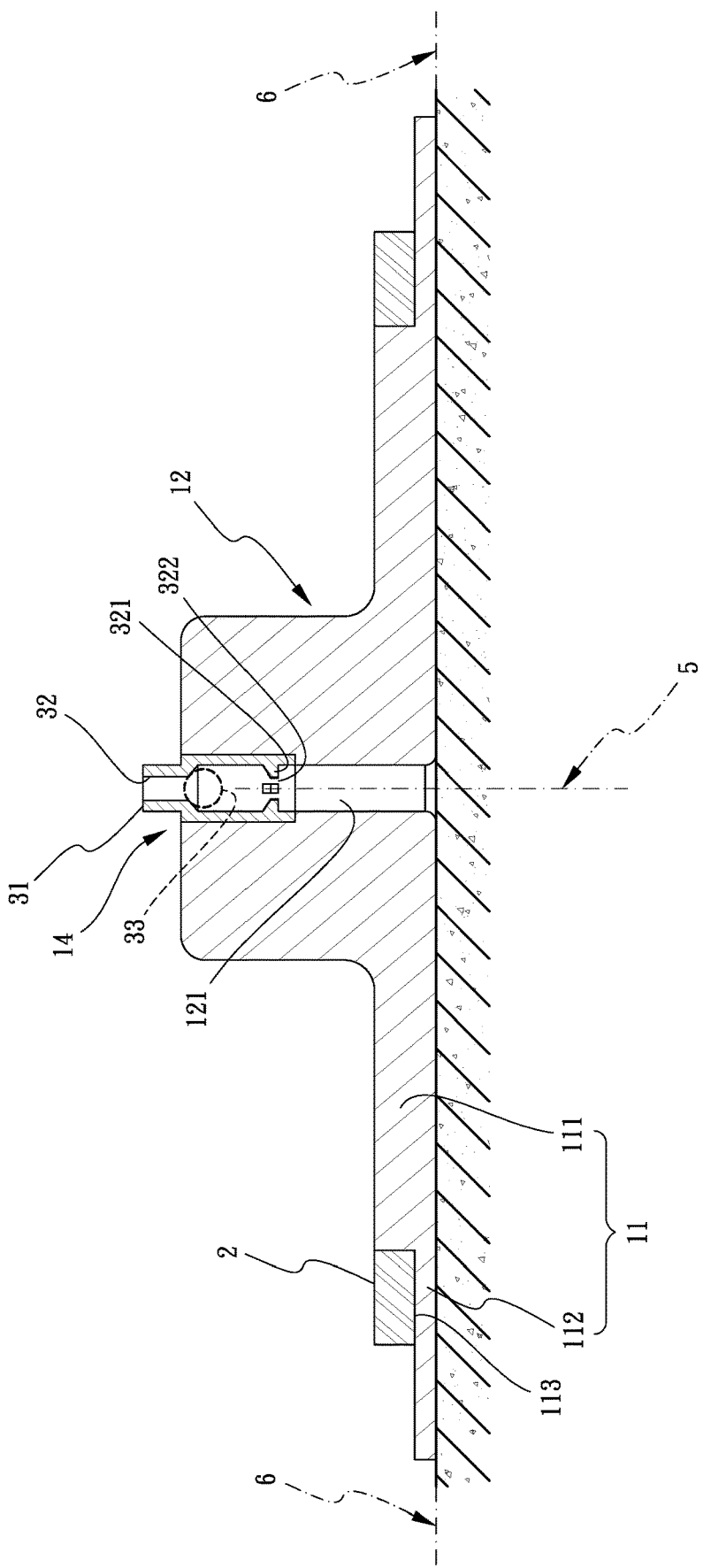

In order to make the suction-cup body 1 combined with the pressure ring 2 well, the suction end 11 of the suction-cup body 1 can be divided into a curved section 111 and a flat section 112. An end of the curved section 111 is connected to periphery of an end of the braking end 12 to form a cone shape, and the flat section 112 is disposed around and connected with the other end of the curved section 111 and extended horizontally. A step groove 113 with height difference is formed between the flat section 112 and the curved section 111, and the pressure ring 2 is disposed on the step groove 113, and a top face of the pressure ring 2 is aligned with an outer surface of the curved section 111, the outer circumferential side of the pressure ring 2 is aligned with the circumferential side of the flat section 112, and no part of the flat section 112 exceeds the pressure ring 2, so as to prevent the flat section 112 from being poked effortlessly. As a result, the suction-cup body 1 can have both of excellent tight suction performance and anti-theft effect, as shown in FIG. 2. Furthermore, with configuration of the pressure ring 2 of the present invention, the pressure ring 2 can press hard on the flat section 112 of the suction end 11 when the suction end 11 is tightly sucked on the car roof. The main purpose of the configuration of the pressure ring 2 is to make the suction end 11 of the suction-cup body 1 tightly sucked on the car roof to form the vacuum status, a reference axis 5 perpendicular to the car roof can be defined based on a center of the exhaust part 14, and auxiliary axes 6 are perpendicularly extended from the reference axis 5 in directions of two sides of the reference axis 5, respectively; each auxiliary axis 6 can be evenly divided into three equal parts, and the pressure ring 2 is located in the outermost peripheral one of the three equal parts of each auxiliary axis 6. As shown in FIG. 2, the outer edge of the pressure ring 2 can be aligned with the outer edge of the suction end 11; or as shown in FIGS. 10 and 11, the outer edge of the pressure ring 2 is not aligned with the outer edge of the suction end 11 but in an indented shape.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An anti-theft suction cup structure, comprising:
   a suction-cup body having a suction end and a braking end disposed on two ends thereof, respectively, wherein the suction end has a cup groove recessed on a side thereof toward the braking end, and the braking end has an exhaust part formed thereon and being in a closed status normally; and
   a pressure ring mounted on an outer periphery of the suction-cup body.

2. The anti-theft suction cup structure according to claim 1, wherein when the suction end of the suction-cup body is deformed to form vacuum for tight attachment, a reference axis is defined based on a center of the exhaust part, and auxiliary axes are perpendicularly extended from the reference axis in directions of two sides of the reference axis, respectively, each of the auxiliary axes is evenly divided into three equal parts and the pressure ring is located in the outermost peripheral one of the three equal parts of each of the auxiliary axes.

3. The anti-theft suction cup structure according to claim 1, wherein the exhaust part comprises a one-way valve, the braking end has a through hole formed thereon and penetrating from a top face of the braking end to the suction end, and the through hole in communication with the cup groove, and the one-way valve is embedded in the through hole and has an end protruded out of the through hole; and
   wherein the one-way valve comprises a valve body, a vent penetrating through two ends of the valve body, and a plug ball, wherein the valve body is embedded in the through hole, and the vent is in communication with the cup groove, and the vent is formed with a plurality of stop ribs protruded on the end of an inner wall thereof embedded in the through hole, the plurality of stop ribs are disposed in interval and around the inner wall of the vent, a plurality of air channels are formed between the plurality of stop ribs, respectively, and the end, where the plurality of stop ribs are disposed, of the vent is tapered toward the end, which is protruded out of the through hole, of the vent, wherein the plug ball is movably disposed in the vent.

4. The anti-theft suction cup structure according to claim 1, wherein the exhaust part comprises a connection hole penetrating from a top face of the braking end to and in communication with the cup groove of the suction end, and the connection hole is formed with at least two valve parts disposed on inner wall thereof, and at least two valve parts are bendable and normally in a closed status.

5. The anti-theft suction cup structure according to claim 1, wherein the suction end of the suction-cup body has a curved section and a flat section, an end of the curved section is connected to periphery of an end of the braking end and forms a cone shape, the flat section is disposed around and connected to the other end of the curved section, a step groove with a height difference is formed between the flat section and the curved section, and the pressure ring is disposed around the step groove, and a top face of the pressure ring is aligned with an outer surface of the curved section.

6. An anti-theft suction cup structure configured to be sucked on or pulled away from a car roof, and for use with an inflating assembly, wherein the inflating assembly comprises an exhaust nozzle, and the anti-theft suction cup structure comprises:

a suction-cup body having a suction end and a braking end disposed on two ends thereof, respectively, wherein the suction end has a cup groove recessed on a side thereof toward the braking end, the braking end has an exhaust part formed thereon and being normally in a closed status, and an end, where the exhaust nozzle is disposed, of the inflating assembly is plugged into the braking end of the suction-cup body for suction; and a pressure ring mounted on an outer periphery of the suction-cup body;

wherein when the suction end of the suction-cup body is used for suction, the exhaust nozzle of the inflating assembly is used to extract air inside the cup groove to form a vacuum status between the cup groove and the car roof, to cause the sidewall of the cup groove of the suction-cup body to be tightly attached on the car roof;

wherein when air is injected into between the cup groove and the car roof through the exhaust nozzle of the inflating assembly, a non-vacuum status is formed between the cup groove and the car roof, wherein in the vacuum status, the pressure ring is configured to press hard on the suction-cup body.

7. The anti-theft suction cup structure according to claim 6, wherein in the vacuum status in which the suction end of the suction-cup body is tightly sucked on the car roof, a reference axis perpendicular to the car roof is defined based on a center of the exhaust part, and auxiliary axes are perpendicularly extended from the reference axis in directions of two sides of the reference axis, respectively, and each of the auxiliary axes is evenly divided into three equal parts, and the pressure ring is located in the outermost peripheral one of the three equal parts of each of the auxiliary axes.

8. The anti-theft suction cup structure according to claim 6, wherein the exhaust part comprises a one-way valve, the braking end has an through hole formed thereon, the through hole penetrates from a top face of the braking end to the suction end and is in communication with the cup groove, and the one-way valve is embedded in the through hole and has an end protruded out of the through hole;

wherein the one-way valve comprises a valve body, a vent penetrating through the two ends of the valve body, and a plug ball, and the valve body is embedded in the through hole, and the vent is in communication with the cup groove, the vent is formed a plurality of stop ribs protruded on the end of an inner wall thereof embedded in the through hole, the plurality of stop ribs are disposed in interval and around the inner wall of the vent, and a plurality of air channels are formed between the plurality of stop ribs, respectively, wherein the end, where the plurality of stop ribs are disposed, of the vent is tapered toward the end, which is protruded out of the through hole, of the vent, and the plug ball is movably disposed in the vent, wherein when the inflating assembly is plugged into the one-way valve, the plug ball is pushed to move toward the plurality of stop ribs for air extraction, and after the inflating assembly completes air extraction to form the vacuum status, an opening of the plug ball is sealed and plugged by the plug ball to block air from entering.

9. The anti-theft suction cup structure according to claim 6, wherein the exhaust part comprises a connection hole penetrating from a top face of the braking end to and in communication with the cup groove of the suction end, and the connection hole is formed with at least two at least two valve parts disposed on inner wall thereof, and the at least two valve parts are bendable and closed normally, and when the inflating assembly is plugged into the braking end, the at least two valve parts are pushed to deform for air extraction or air injection; wherein after the inflating assembly is pulled away from the braking end, the at least two valve parts are restored to a normally closed status.

10. The anti-theft suction cup structure according to claim 6, wherein the suction end of the suction-cup body has a curved section and a flat section, and an end of the curved section is connected to periphery of an end of the braking end to form a cone shape, and the flat section is disposed around and connected to the other end of the curved section, a step groove with height difference is formed between the flat section and the curved section, and the pressure ring is disposed around the step groove, and a top face of the pressure ring is aligned with an outer surface of the curved section.

\* \* \* \* \*